UNITED STATES PATENT OFFICE.

JULIUS BAUR, OF BROOKLYN, NEW YORK.

IMPROVED PROCESS FOR RENDERING BARRELS IMPERVIOUS TO PETROLEUM, &c.

Specification forming part of Letters Patent No. 49,215, dated August 8, 1865; antedated July 24, 1865.

*To all whom it may concern:*

Be it known that I, JULIUS BAUR, of Brooklyn, in the county of Kings and State of New York, have invented a new and Improved Lining for Packages of Petroleum and other Articles; and I do hereby declare that the following is a full, clear, and exact description thereof, which will enable others skilled in the art to fully understand and make use of the same.

This lining is particularly intended for preventing leakage in petroleum barrels or packages; but it can be used with advantage for barrels or kegs containing paints or oils of any other description.

The barrel or package which is to be made oil-tight is first treated with a solution of alum containing about one pound of alum to a gallon of water, at a temperature of about 90° Fahrenheit, until the wood is thoroughly impregnated with said solution. After this process and when the wood is dry the barrel or package is treated with a cold solution of soluble glass, which consists of about one part of soluble glass and two parts of water. When again dry the same operation is repeated with the same solution, and finally a coat of a concentrated solution of soluble glass is given to the package on the inside and outside.

The soluble glass may be silicate of potash or of soda, and instead of alum the following salts can be used—viz., sulphate of iron, sulphate of zinc, sulphate of manganese, chlorate of iron, chlorate of zinc, chlorate of manganese, and, if desirable, similar salts of other metals, though all other salts besides those above named are too high in price to be of any practical account.

The alum or other salt serves as a mordant, whereby the liquid glass is enabled to combine more intimately with the wood fiber than it is when applied directly to the wood. When the soluble glass comes in contact with the alum the latter is partially decomposed and silicic acid and oxide of aluminum are precipitated on the wood and sulphate of potash is formed, which, in combination with the silicate of potash or soda, forms the desired coating for the vessel.

I do not claim as my invention the use of soluble glass for lining barrels, as this has been previously tried and failed to accomplish the desired object; but

I claim as new and desire to secure by Letters Patent—

The within-described process of producing an oil-tight lining for barrels, &c., by first treating the wood with alum or its equivalent and afterward with soluble glass, substantially as and for the purpose set forth.

JULIUS BAUR.

Witnesses:
JAMES P. HALL,
M. M. LIVINGSTON.